United States Patent
Kita et al.

(10) Patent No.: US 12,384,243 B2
(45) Date of Patent: Aug. 12, 2025

(54) REACTION FORCE APPLYING DEVICE

(71) Applicant: DENSO CORPORATION, Kariya (JP)

(72) Inventors: Takuto Kita, Kariya (JP); Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/637,536

(22) Filed: Apr. 17, 2024

(65) Prior Publication Data

US 2024/0278641 A1    Aug. 22, 2024

Related U.S. Application Data

(63) Continuation of application No. PCT/JP2022/039168, filed on Oct. 20, 2022.

(30) Foreign Application Priority Data

Oct. 21, 2021  (JP) ................. 2021-172599

(51) Int. Cl.
  *B60K 26/02*   (2006.01)
  *G05G 1/30*    (2008.04)
  *G05G 5/03*    (2008.04)
  *G05G 1/44*    (2008.04)

(52) U.S. Cl.
  CPC .......... *B60K 26/021* (2013.01); *G05G 5/03* (2013.01); *G05G 1/44* (2013.01)

(58) Field of Classification Search
  CPC ...... B60K 26/02; B60K 26/021; B60K 26/04; B60K 2026/022; B60K 2026/023; G05G 1/30; G05G 1/38; G05G 1/44; G05G 5/03
  See application file for complete search history.

(56) References Cited

U.S. PATENT DOCUMENTS

| | | | | |
|---|---|---|---|---|
| 8,521,360 B2 * | 8/2013 | Yamazaki | ................ | G05G 1/30 701/36 |
| 9,079,492 B2 * | 7/2015 | Osawa | ................ | B60K 26/021 |
| 9,475,386 B2 * | 10/2016 | Horiuchi | ................ | B60K 26/02 |
| 10,124,673 B2 * | 11/2018 | Kouzuma | ................ | G05G 5/03 |
| 10,146,247 B2 * | 12/2018 | Ooba | ................ | B60K 26/021 |
| 12,084,022 B2 * | 9/2024 | Yanagida | ................ | B60T 11/18 |
| 2010/0083789 A1 | 4/2010 | Kawade | | |
| 2012/0096976 A1 * | 4/2012 | Leone | ................ | G05G 1/30 74/513 |
| 2015/0360563 A1 | 12/2015 | Horiuchi et al. | | |

(Continued)

FOREIGN PATENT DOCUMENTS

JP    2001310648 A  * 11/2001
JP    2012-82725      4/2012

(Continued)

*Primary Examiner* — Adam D Rogers
(74) *Attorney, Agent, or Firm* — Nixon & Vanderhye P.C.

(57) ABSTRACT

A reaction force applying device includes an actuator housing, an actuator, a lever, a connected part, and a connecting part. The actuator housing is attachable to a vehicle. The actuator is provided in the actuator housing. The lever is provided in the actuator housing to be rotatable by receiving a driving force from the actuator, to contact an arm that rotates with a pedal, and to be capable of applying a reaction force to the pedal against a driver's stepping force. The connected part is provided in a pedal housing, and the connecting part is provided in the actuator housing and connected to the connected part.

8 Claims, 6 Drawing Sheets

(56) References Cited

U.S. PATENT DOCUMENTS

2018/0001763 A1* 1/2018 Kouzuma ................ G05G 1/44
2019/0081419 A1 3/2019 Hsieh
2021/0078549 A1 3/2021 Tsuguma
2024/0100945 A1* 3/2024 Mori ...................... B60K 26/02

FOREIGN PATENT DOCUMENTS

| WO | WO-2012029503 A1 * | 3/2012 | ........... B60K 26/021 |
| WO | WO-2023068336 A1 * | 4/2023 | |
| WO | WO-2024070627 A1 * | 4/2024 | |
| WO | WO-2024070631 A1 * | 4/2024 | |
| WO | WO-2024070632 A1 * | 4/2024 | |

* cited by examiner

REACTION FORCE APPLYING DEVICE

CROSS REFERENCE TO RELATED APPLICATION

The present application is a continuation application of International Patent Application No. PCT/JP2022/039168 filed on Oct. 20, 2022, which designated the U.S. and claims the benefit of priority from Japanese Patent Application No. 2021-172599 filed on Oct. 21, 2021. The entire disclosures of all of the above applications are incorporated herein by reference.

TECHNICAL FIELD

The present disclosure relates to a reaction force applying device.

BACKGROUND

Conventionally, there has been known a reaction force applying device that is capable to apply a reaction force against a driver's stepping force to a pedal of an accelerator device that includes a pedal to be stepped by a driver.

SUMMARY

The present disclosure relates to a reaction force applying device configured to apply, against a stepping force of a driver, a reaction force to a pedal of an accelerator device that includes: the pedal to be stepped by the driver; and a pedal housing provided to rotatably support the pedal and to be attached to a vehicle. The reaction force applying device includes an actuator housing, an actuator, a lever, a connected part, and a connecting part.

The actuator housing is attachable to the vehicle, and the actuator is provided in the actuator housing. The lever is provided at the actuator housing to be rotatable by receiving a driving force from the actuator, to contact the pedal or an arm rotating with the pedal, and to apply a reaction force to the pedal with respect to the stepping force of the driver. The connected part may be provided in the pedal housing, and the connecting part may be provided in the actuator housing and connected to the connected part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
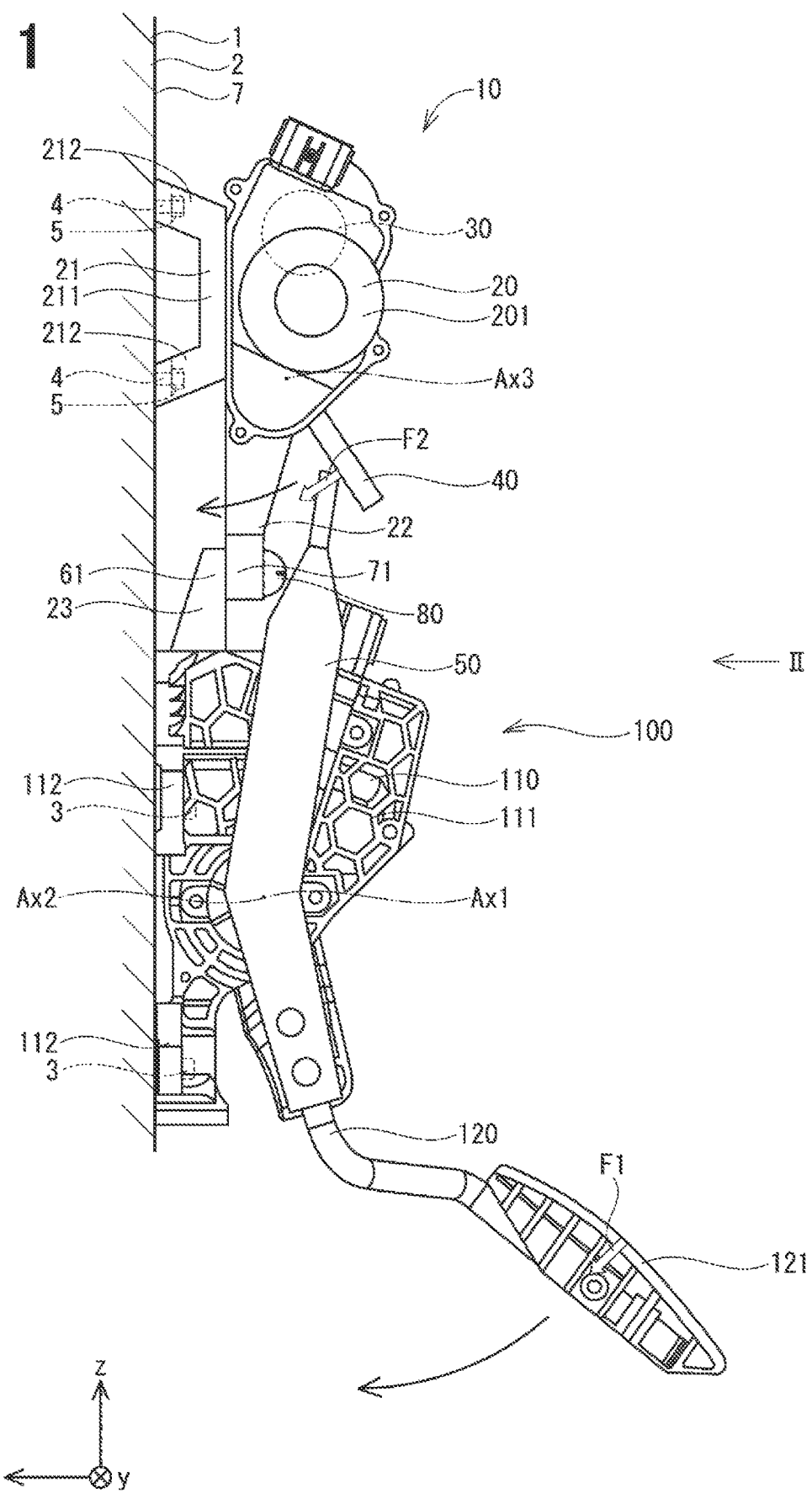
FIG. 1 is a diagram showing a reaction force applying device according to a first embodiment and an accelerator device to which the same is applied.

A reaction force applying device may be applied to an accelerator device that includes a pedal to be stepped by a driver. The reaction force applying device includes a lever that is in contact with an arm rotating together with a pedal of an accelerator device and can apply a reaction force to the pedal against a driver's stepping force.

For example, the reaction force applying device is attached to a vehicle at a position away from the accelerator device by a predetermined distance. That is, the reaction force applying device and the accelerator device are respectively attached to different positions on a floor of the vehicle. In this case, there is a possibility that a deviation of a contact point between the lever of the reaction force applying device and the arm of the accelerator device becomes large. As a result, a deviation amount of the reaction force with respect to a target reaction force increases, which may lead to a feeling reduce of driver notifications (notification for the driver) using a reaction force, such as dangerousness notification, fuel efficiency improvement notification and the like.

It is an object of the present disclosure to provide a reaction force applying device that is capable of suppressing an increase in a deviation amount of reaction force with respect to a target reaction force.

According to an exemplar of the present application, a reaction force applying device may be configured to apply, against a stepping force of a driver, a reaction force to a pedal of an accelerator device that includes: the pedal to be stepped by the driver; and a pedal housing provided to rotatably support the pedal and to be attached to a vehicle. The reaction force applying device includes an actuator housing, an actuator, a lever, a connected part, and a connecting part. Here, "attached (attachable) to a vehicle" means not only a case where it can be attached directly to a vehicle, but also a case where it can be attached indirectly to a vehicle via another member. The same applies hereinafter.

The actuator housing is attachable to the vehicle, and the actuator is provided in the actuator housing. The lever is provided at the actuator housing to be rotatable by receiving a driving force from the actuator, to contact the pedal or an arm rotating with the pedal, and to apply a reaction force to the pedal with respect to the stepping force of the driver. Furthermore, the connected part is provided in the pedal housing, and the connecting part is provided in the actuator housing and connected to the connected part.

In the above exemplar, the connected part provided in the pedal housing of the accelerator device and the connecting part provided in the actuator housing of the reaction force applying device are connected. Therefore, it is possible to reduce variation of a relative position between the pedal housing and the actuator housing during attachment of the device to a vehicle. Thus, it is possible to reduce the deviation of the contact point between the lever of the reaction force applying device and the pedal or arm of the accelerator device. As a result, a deviation amount of reaction force with respect to the target reaction force can be reduced. Thus, it is possible to prevent deteriorated feeling of driver notification (notification for a driver) using the reaction force.

Hereinafter, a reaction force applying device according to a plurality of embodiments and an accelerator device to which the same is applied will be described based on the drawings. Elements that are substantially the same in the embodiments are denoted by the same reference signs and will not be described.

First Embodiment

Figure 2:
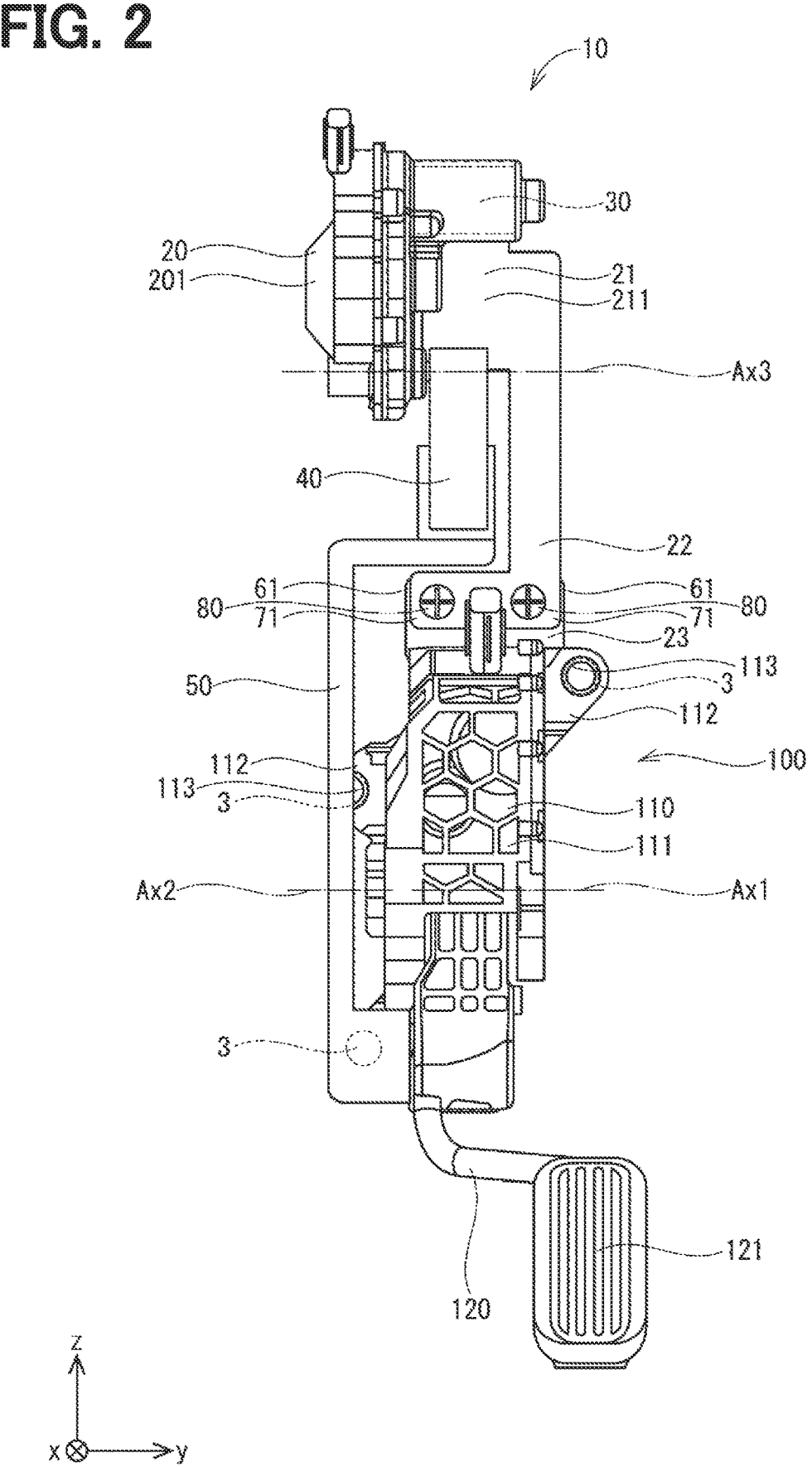
FIG. 2 is a diagram when being viewed in a direction of an arrow II of FIG. 1.

A reaction force applying device according to a first embodiment and an accelerator device to which the reaction force applying device is applied are shown in FIGS. 1 and 2.

An accelerator device 100 is mounted on a vehicle 1, and is used to control a travel state of the vehicle 1 by detecting an accelerator opening degree corresponding to a rotation angle of a pedal 120 stepped on by a driver. The accelerator device 100 employs an accelerator-by-wire system, and is not mechanically connected to a throttle device of the vehicle 1. The accelerator device 100 transmits information of the accelerator opening degree corresponding to the rotation angle of the pedal 120 to an electronic control unit (hereinafter referred to as "ECU"), which is not shown. The ECU controls the throttle device based on the accelerator opening degree transmitted from the accelerator device 100. Thereby, a travel state of the vehicle 1 is controlled.

A reaction force applying device 10 is mounted on the vehicle 1 together with the accelerator device 100, and can apply a reaction force F2 to the pedal 120 of the accelerator device 100 against a driver's stepping force F1. By applying a reaction force to the pedal 120 of the accelerator device 100, the reaction force applying device 10 can provide a driver notification (notification for the driver) such as dangerousness notification or fuel efficiency improvement notification. Further, the reaction force applying device 10 can serve the pedal 120 as a footrest by regulating the rotation of the pedal 120.

The accelerator device 100 includes a pedal housing 110, the pedal 120, and the like. The pedal housing 110 has a housing body 111 and a housing attachment portion 112. The housing body 111 has a space which is capable of accommodating components therein. The housing attachment portion 112 is formed integrally with the housing body 111 in a form protruding from the housing body 111. In the present embodiment, for example, three housing attachment portions 112 are formed (see FIG. 2). A bolt hole 113 is formed in the housing attachment portion 112. The pedal housing 110 is attached to a floor panel 2 by, for example, passing an attachment bolt 3 through the bolt hole 113, screwing the bolt 3 into the floor panel 2 of the vehicle 1, and fixing the housing attachment portion 112 to the floor panel 2.

In FIG. 1, an x-axis indicates a travel direction of the vehicle 1, a y-axis indicates a width direction of the vehicle, and a z-axis indicates a vertically upward direction. Hereinafter, unless otherwise specified, the shape or configuration of the accelerator device 100 and the reaction force applying device 10 in an attached state where they are attached to the vehicle 1 will be described. For example, the term "upward" or "upper side" means the upward or upper side of the accelerator device 100 or the reaction force applying device 10 in the attached state where it is attached to the vehicle 1. Furthermore, in the present embodiment, the floor panel 2 has a wall surface 7 parallel to a yz plane.

One end of the pedal 120 is rotatably supported by the housing body 111 of the pedal housing 110 for rotation about a rotation axis Ax1. An other end of the pedal 120 is provided with a pad 121 that is stepped on by the driver. Inside the housing body 111, an accelerator opening degree sensor (not shown) is provided on the rotation axis Ax1. The accelerator opening degree sensor detects an accelerator opening degree corresponding to the rotation angle of the pedal 120 rotated by the driver's stepping operation, and transmits a detected accelerator opening degree to the ECU. Note that the rotation axis Ax1 is set to be perpendicular to the z-axis and the x-axis, and parallel with the y-axis.

A pedal biasing member (not shown) is provided inside the housing body 111 of the pedal housing 110. The pedal biasing member biases the pedal 120 in an accelerator closing direction. The pedal housing 110 includes (i) a stopper that restricts rotation of the pedal 120 in the accelerator closing direction and (ii) a stopper that restricts rotation of the pedal 120 in an accelerator opening direction. The pedal 120 is allowed to rotate, within a range which is defined as the pedal 120 abuts to those stoppers. FIG. 1 shows a state in which the pedal 120 is in abutment with a stopper in the accelerator closing direction, that is, a state in which the accelerator is fully closed.

As shown in FIGS. 1 and 2, the reaction force applying device 10 includes an actuator housing 20, an actuator 30, a lever 40, a connected part 61, and a connecting part 71.

The actuator housing 20 is attachable to the vehicle 1. The actuator 30 is provided in the actuator housing 20. The lever 40 is provided in the actuator housing 20, rotates by a driving force from the actuator 30, contacts an arm 50 that rotates together with the pedal 120, and is capable of applying a reaction force to the pedal 120 against the driver's stepping force.

More specifically, the actuator housing 20 includes a housing body 201, a pedestal portion 21, and an actuator-side extender 22. The housing body 201 has a space formed therein for accommodating the actuator 30 and the like.

The pedestal portion 21 has a pedestal body 211 and a pedestal leg 212. The pedestal body 211 has a plate shape, integrally with the housing body 201. A total of two pedestal legs 212 are provided, one at each end of the pedestal body 211 in a plate surface direction (the z-axis direction in FIG. 1). The pedestal leg 212 has one body, integrally with the pedestal body 211, to extend obliquely from the pedestal body 211 in a plate-thickness direction.

The actuator housing 20 is attached to the floor panel 2, by fixing the pedestal leg 212 of the pedestal portion 21 to the wall surface 7 of the floor panel 2 with, for example, a vehicle-body-side bolt 4 provided on the floor panel 2 of the vehicle 1 and a nut 5 screwed onto the vehicle-body-side bolt 4. The attachment of the reaction force applying device 10 including the actuator housing 20 to the vehicle 1 will further be described later.

The actuator-side extender 22 is formed integrally with the pedestal body 211 of the pedestal portion 21, extending downward from the pedestal body 211. The actuator-side extender 22 is formed into a substantially L-shaped plate shape, for example, so that an end opposite to the pedestal body 211 is bent (see FIG. 2).

The actuator 30 is, for example, an electric motor, and is housed within the housing body 201 of the actuator housing 20. The actuator 30 can output torque as a driving force when receiving a supply of electric power. The ECU can control a supply of electric power to the actuator 30, for controlling an operation of the actuator 30. A speed reducer (not shown) consisting of a plurality of gears is provided in the housing body 201. The speed reducer can reduce and output the torque of the actuator 30.

One end of the lever 40 is rotatably supported by the actuator housing 20 for a rotation about a rotation axis Ax3. One end of the lever 40 is connected to the speed reducer in the housing body 201. The lever 40 rotates about the rotation axis Ax3 by a driving force from the actuator 30 that is output from the speed reducer.

In the present embodiment, the arm 50 is provided in the accelerator device 100. The arm 50 is formed to have a bending rod shape, and is attached to the pedal 120 with one end thereof fixed to the pedal 120. Such a configuration allows the arm 50 to rotate together with the pedal 120. Therefore, a rotation axis Ax2 of the arm 50 coincides with the rotation axis Ax1 of the pedal 120.

An other end of the lever 40, that is, an end opposite to the rotation axis Ax3, is contactable with an other end of the arm 50, that is, an end opposite to the pedal 120. The lever 40 is capable of applying the reaction force F2 to the pedal 120 via the arm 50, by (i) being rotated by the driving force from the actuator 30, (ii) coming into contact with the other end of the arm 50 that rotates together with the pedal 120, and (iii) applying the reaction force F2 to the arm 50 against the driver's stepping force F1.

The connected part 61 is provided in the pedal housing 110. The connecting part 71 is provided at the actuator housing 20, and is connected to the connected part 61.

In the present embodiment, two connected parts 61 are provided. Two connecting parts 71 are also provided.

More specifically, the pedal housing 110 is provided with a pedal-side extender 23. The pedal-side extender 23 has one body formed integrally with the housing body 111 of the pedal housing 110, extending upward from the housing body 111. The pedal-side extender 23 is formed, for example, in a rectangular plate shape (see FIGS. 1 and 2). The pedal-side extender 23 is formed to be able to come into contact with the end of the actuator-side extender 22 on the side opposite to the pedestal portion 21.

Figure 3:
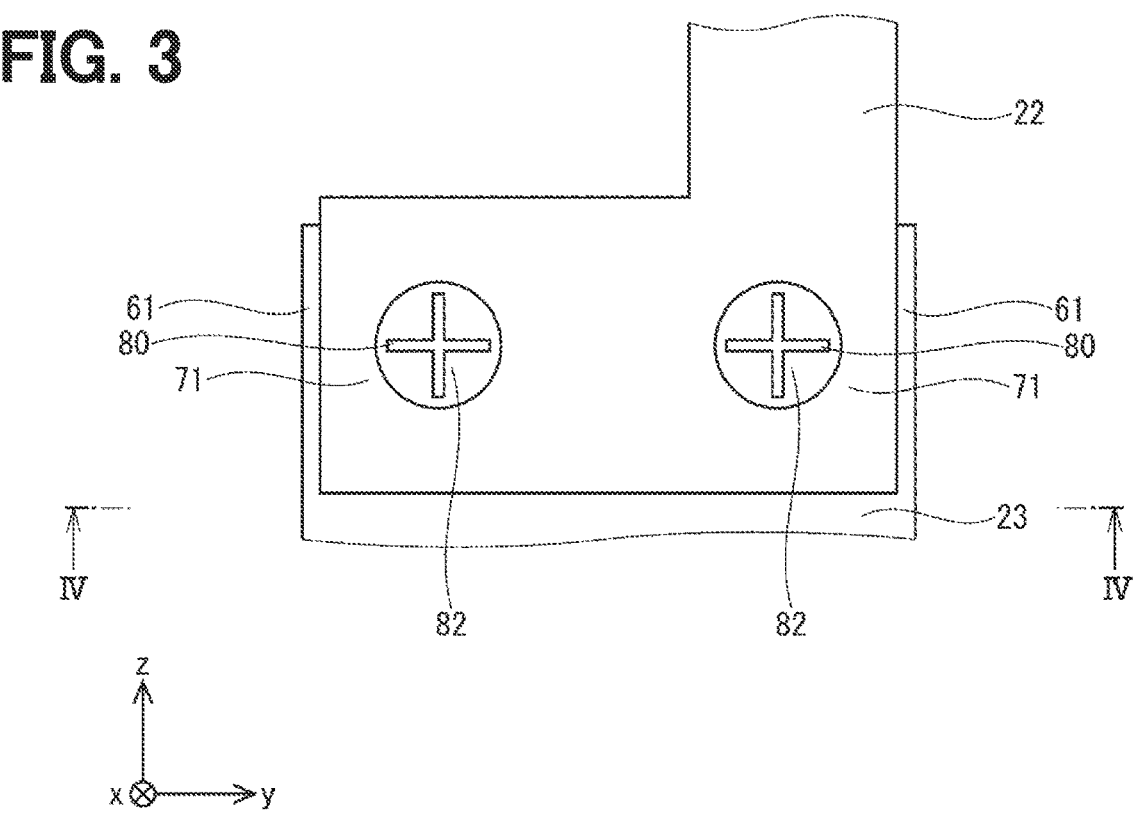
FIG. 3 is a schematic diagram showing a connecting part and a connected part of the reaction force applying device of the first embodiment.

The connected parts 61 are formed at two locations on the pedal-side extender 23, that is, two connected parts 61 are formed. The connecting parts 71 are formed at two locations on an end portion of the actuator-side extender 22, i.e., on an opposite side from the pedestal portion 21, thereby two connecting parts 71 are formed. The two connecting parts 71 are respectively connected by coming into contact with the two connected parts 61, respectively (see FIGS. 3 and 4).

In the present embodiment, a bolt 80 that fastens the connected part 61 and the connecting part 71 is further provided.

Figure 4:
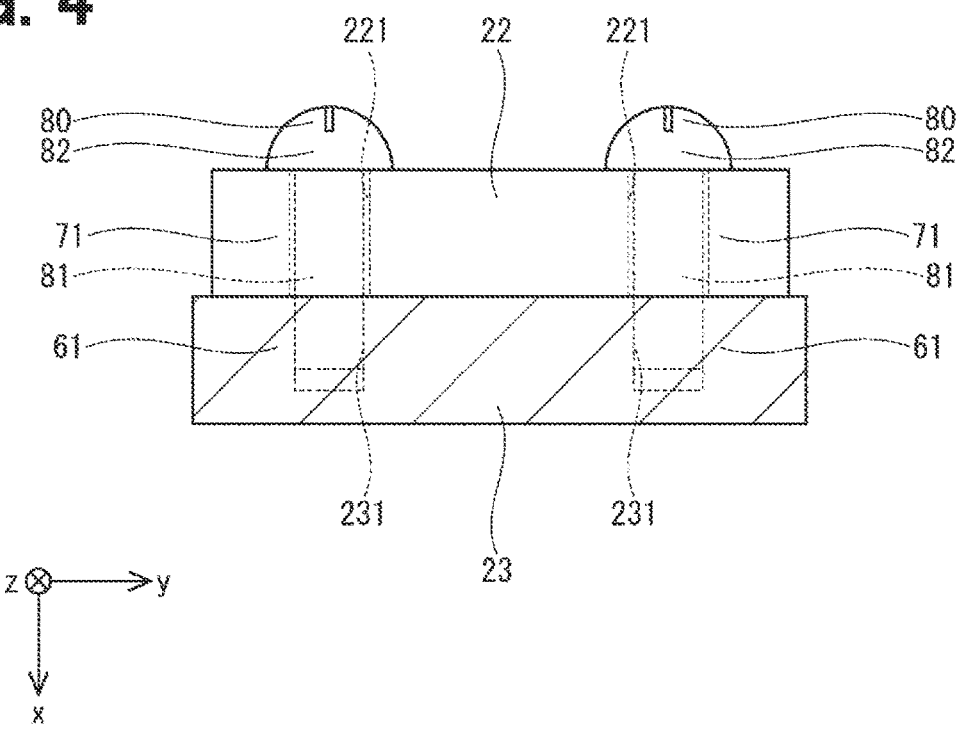
FIG. 4 is a cross-sectional view taken along a line IV-IV of FIG. 3.

More specifically, as shown in FIG. 4, the bolt 80 has a bolt shaft 81 and a bolt head 82. The bolt shaft 81 is formed into a rod shape, and has a male thread groove formed on its outer peripheral wall. The bolt head 82 is provided integrally with the bolt shaft 81 at one end of the bolt shaft 81. An outer diameter of the bolt head 82 is larger than an outer diameter of the bolt shaft 81.

A bolt hole 221 passing through the actuator-side extender 22 in the plate-thickness direction is formed at a position corresponding to the connecting part 71 of the actuator-side extender 22. In other words, an area around the bolt hole 221 of the actuator-side extender 22 corresponds to the connecting part 71. A bolt hole 231 is formed at a position corresponding to the connected part 61 of the pedal-side extender 23. In other words, a periphery of the bolt hole 231 of the pedal-side extender 23 corresponds to the connected part 61. A female thread groove is formed on an inner circumferential wall of the bolt hole 231. The bolt 80 fastens, or connects, the connected part 61 and the connecting part 71, when the bolt shaft 81 passes through the bolt hole 221 and is screwed into the bolt hole 231, and the bolt head 82 engages the actuator-side extender 22.

By connecting the connected part 61 and the connecting part 71 and fastening the connected part 61 and the connecting part 71 with the bolt 80, a relative position of the pedal housing 110 and the actuator housing 20 is defined.

Next, a procedure for attaching the accelerator device 100 and the reaction force applying device 10 to the vehicle 1, and assembling the accelerator device 100 and the reaction force applying device 10 will be described.

In the present embodiment, the accelerator device 100 is first attached to the vehicle 1 by fixing the pedal housing 110 to the floor panel 2 with the attachment bolts 3. Then, the accelerator device 100 and the reaction force applying device 10 are assembled. Specifically, the connected part 61 on the accelerator device 100 and the connecting part 71 on the reaction force applying device 10 are connected, and the connected part 61 and the connecting part 71 are fastened with the bolt 80.

Then, the reaction force applying device 10 is attached to the vehicle 1 by fixing the actuator housing 20 to the floor panel 2. Specifically, the reaction force applying device 10 is attached to the vehicle 1, by (a) passing each of the two vehicle-body-side bolts 4 through each of two attachment holes 213 formed on the pedestal leg 212 of the actuator housing 20, and (b) screwing the nut 5 onto the vehicle-body-side bolt 4 to fix the pedestal leg 212 onto the floor panel 2 (see FIG. 5).

The above-described procedure completes the attachment of the accelerator device 100 and the reaction force applying device 10 to the vehicle 1, and the assembly of the accelerator device 100 and the reaction force applying device 10.

Figure 5:
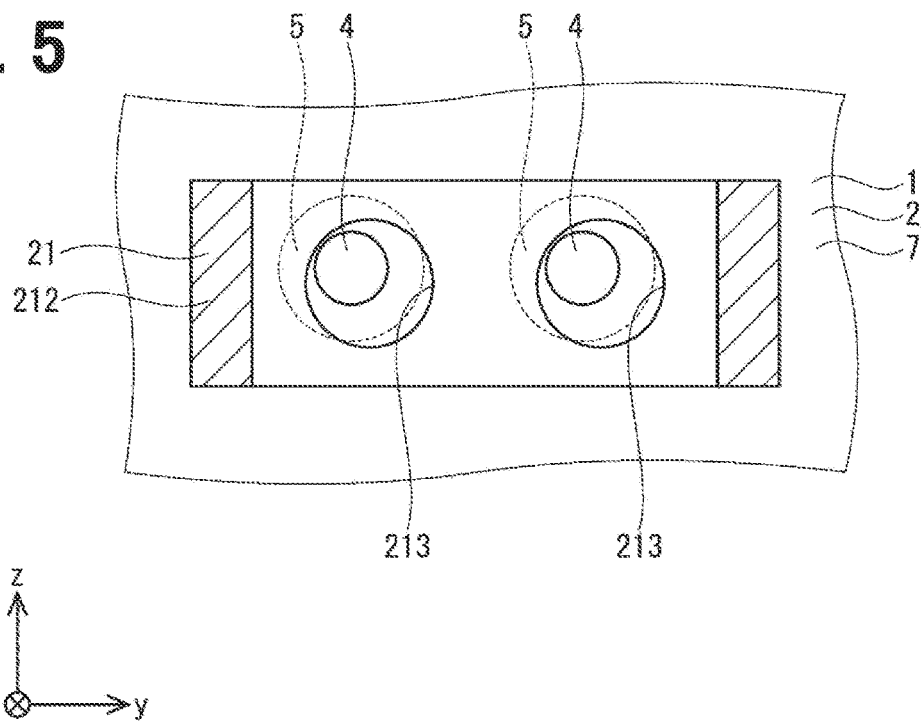
FIG. 5 is a schematic diagram showing a part of the reaction force applying device of the first embodiment.

As shown in FIG. 5, an inner diameter of the attachment hole 213 is greater than an outer diameter of the vehicle-body-side bolt 4, by a predetermined amount. The predetermined amount can be set by an addition of (i) a difference between an inner diameter of the bolt hole 113 formed in the housing attachment portion 112 of the pedal housing 110, and an outer diameter of the threaded portion of the attachment bolt 3, (ii) a positional variation between the bolt hole 113, the connected part 61 and the bolt hole 231, and (iii) a positional variation between the connecting part 71 and the bolt hole part 221, and the attachment hole 213. Therefore, a tolerance of each of the above-described factors can be absorbed on an actuator housing 20 side, and the attachment of the accelerator device 100 and the reaction force applying device 10 to the vehicle 1 and the assembly of the accelerator device 100 and the reaction force applying device 10 are facilitated.

As explained above, in the present embodiment, the connected part 61 is provided in the pedal housing 110. The connecting part 71 is provided in the actuator housing 20, and is connected to the connected part 61.

In the present embodiment, the connected part 61 provided on the pedal housing 110 of the accelerator device 100 and the connecting part 71 provided on the actuator housing 20 of the reaction force applying device 10 are connected. Therefore, when the pedal housing 110 and the actuator housing 20 are attached to the vehicle 1, variation of the relative position of the pedal housing 110 and the actuator housing 20 can be reduced. Thereby, the deviation of the contact point between the lever 40 of the reaction force applying device 10 and the arm 50 of the accelerator device 100 can be reduced. Therefore, the deviation amount of reaction force with respect to the target reaction force can be reduced. Thus, it is possible to prevent deteriorated feeling of driver notification (notification for a driver) using the reaction force.

Further, in the present embodiment, two connected parts 61 are provided. Two connecting parts 71 are also provided. Therefore, relative rotation between the pedal housing 110 and the actuator housing 20 is suppressed, thereby further reducing variation of relative position therebetween.

Further, the present embodiment includes the bolt 80 that fastens the connected part 61 and the connecting part 71. Therefore, even after the assembly of the accelerator device 100 and the reaction force applying device 10, the connection between the connected part 61 (corresponding to a first connection part) and the connecting part 71 (corresponding to a second connection part) is maintained, and the variation of the relative position between the pedal housing 110 and the actuator housing 20 can be reduced over a long period of time.

Second Embodiment

Figure 6:
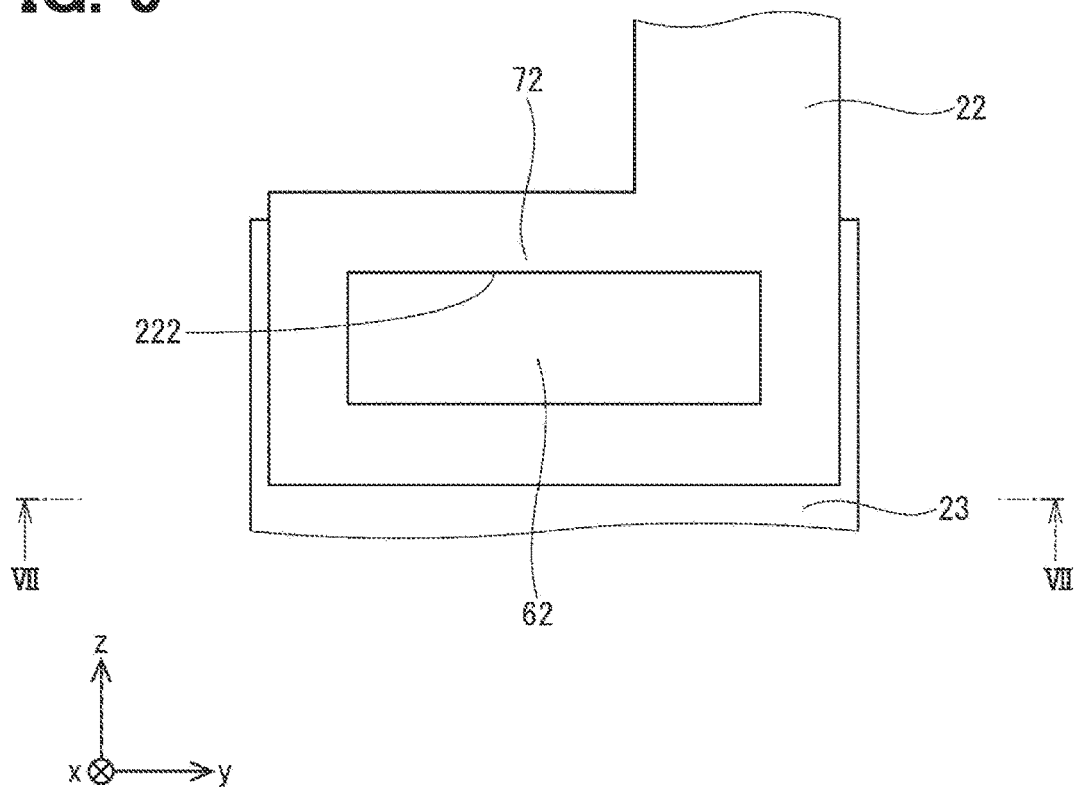
FIG. 6 is a schematic diagram showing a connecting part and a connected part of a reaction force applying device according to a second embodiment.
Figure 7:
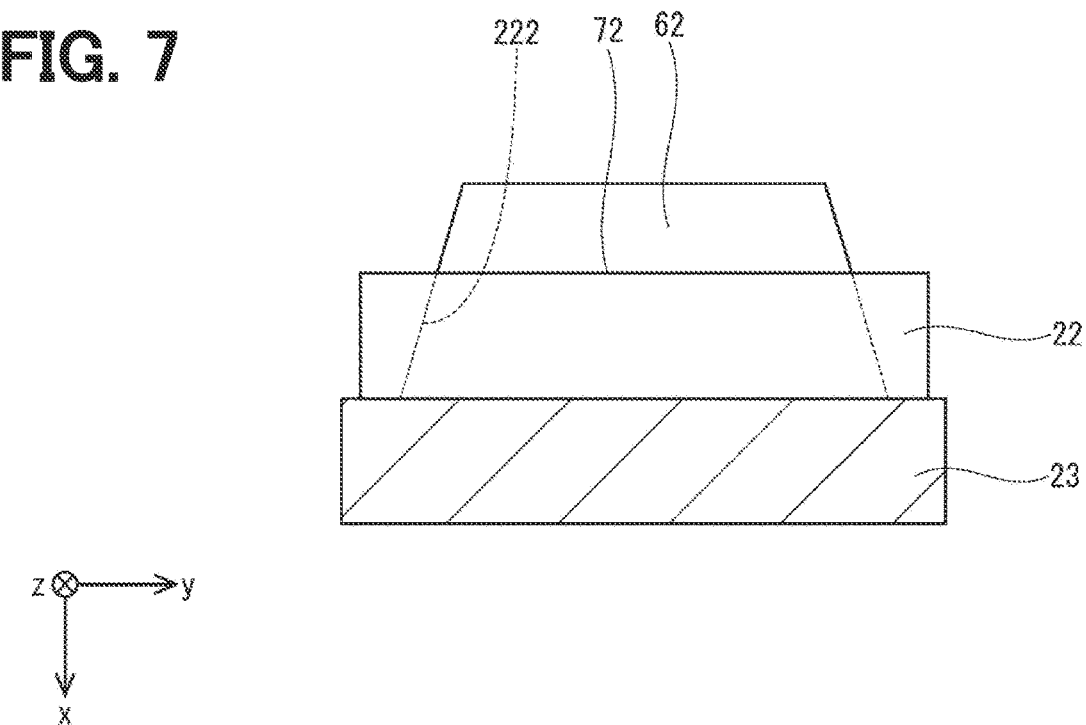
FIG. 7 is a cross sectional view taken along a line VII-VII of FIG. 6.

A part of the reaction force applying device and the accelerator device according to the second embodiment are shown in FIGS. 6 and 7. The second embodiment differs from the first embodiment in the configurations of the connected part and the connecting part.

In the present embodiment, an actuator-side extender 22 has, formed thereon, a press-fit hole 222 instead of the bolt hole 221. The press-fit hole 222 is formed in a rectangular shape to penetrate the actuator-side extender 22 in the plate-thickness direction at an end of the actuator-side extender 22 opposite to a pedestal portion 21. A connecting part 72 is formed on an inner wall of the press-fit hole 222 and around the press-fit hole 222. That is, the inner wall of the press-fit hole 222 and a periphery of the press-fit hole 222 on the actuator-side extender 22 correspond to the connecting part 72.

A connected part 62 is formed on a pedal-side extender 23 in place of the bolt hole 231. The connected part 62 is formed to protrude in a rectangular column shape from a surface of the pedal-side extender 23 on an actuator-side extender 22 side in the plate-thickness direction.

The connecting part 72 has a rectangular cross-sectional shape taken along a plane perpendicular to the plate-thickness direction of the actuator-side extender 22, that is, a non-perfect circular shape. The connected part 62 has a rectangular cross-sectional shape taken along a plane perpendicular to the plate-thickness direction of the pedal-side extender 23, that is, a non-perfect circular shape.

In the present embodiment, the connected part 62 and the connecting part 72 are connected by press fitting.

More specifically, when assembling the accelerator device 100 and the reaction force applying device 10, the connected part 62 is press-fitted into the press-fit hole 222, that is, the connecting part 72. Thereby, the connection between the connected part 62 and the connecting part 72 is complete, and the assembly of the accelerator device 100 and the reaction force applying device 10 is complete.

As explained above, the cross-sectional shape of the connected part 62 is a non-perfect circular shape. The cross-sectional shape of the connecting part 72 is a non-perfect circle. Therefore, relative rotation between the pedal housing 110 and the actuator housing 20 is suppressed, thereby further reducing variation of relative position therebetween.

Further, in the present embodiment, the connected part 62 and the connecting part 72 are connected by press fitting.

Therefore, the connected part 62 and the connecting part 72 can be easily connected, and, even after assembly of the accelerator device 100 and the reaction force applying device 10, the connection between the connected part 62 and the connecting part 72 are maintained, and variation of the relative position of the pedal housing 110 and the actuator housing 20 can be reduced over a long period of time.

Third Embodiment

Figure 8:
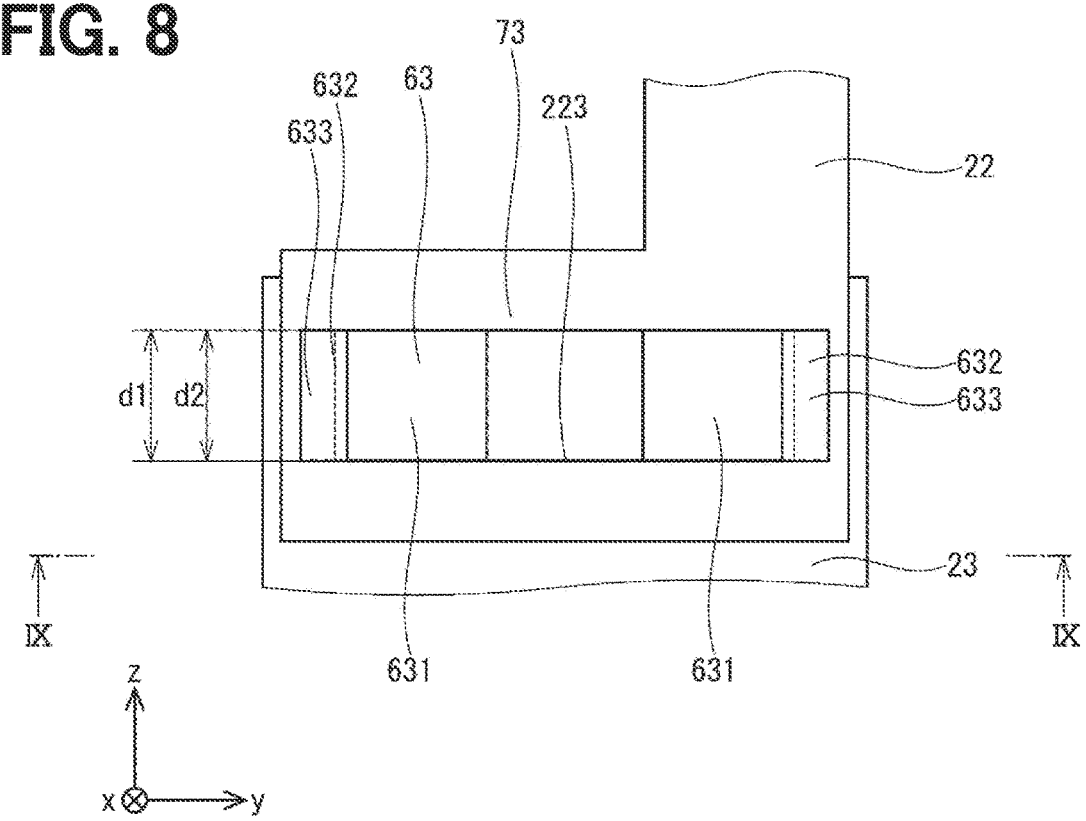
FIG. 8 is a schematic diagram showing a connecting part and a connected part of a reaction force applying device according to a third embodiment.
Figure 9:
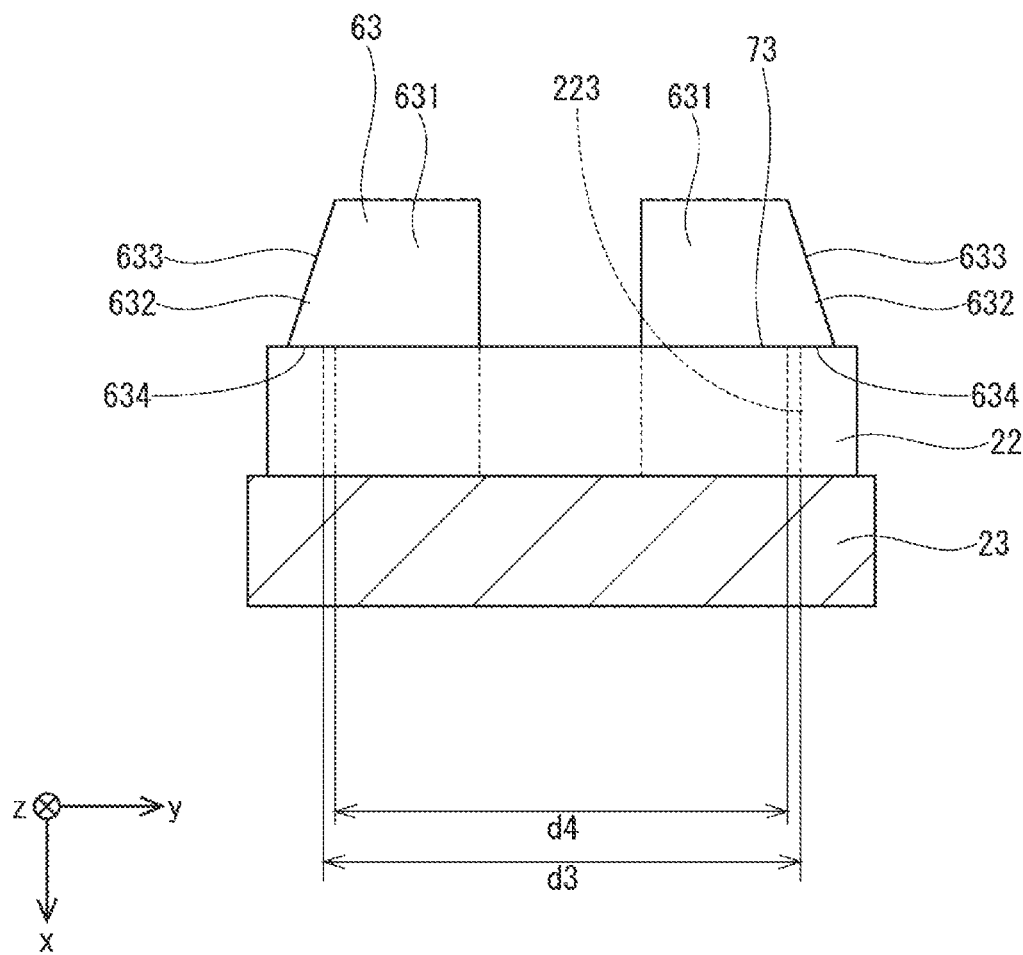
FIG. 9 is a cross-sectional view taken along a line IX-IX in FIG. 8.

A part of a reaction force applying device and an accelerator device according to the third embodiment are shown in FIGS. 8 and 9. The third embodiment differs from the second embodiment in the configurations of the connected part and the connecting part.

In the present embodiment, an actuator-side extender 22 is formed with a snap-fit hole 223 instead of the press-fit hole 222. The snap-fit hole 223 is formed in a rectangular shape to penetrate an actuator-side extender 22 in the plate-thickness direction at an end of the actuator-side extender 22 on the opposite side from a pedestal portion 21. A connecting part 73 is formed on an inner wall of the snap-fit hole 223 and around the snap-fit hole 223. That is, the inner wall of the snap-fit hole 223 and a periphery of the snap-fit hole 223 on the actuator-side extender 22 correspond to the connecting part 73.

A connected part 63 is formed on a pedal-side extender 23 in place of the connected part 62. The connected part 63 has a connected part body 631 and an engager 632. The connected part body 631 is formed to protrude in a rectangular column shape in the plate-thickness direction from the surface of the pedal-side extender 23 on an actuator-side extender 22 side. Two connected part bodies 631 are formed on the pedal-side extender 23. The connected part body 631 is inserted into the snap-fit hole 223, for an end thereof opposite to the pedal-side extender 23 to protrude from the actuator-side extender 22.

A size d1 of the snap-fit hole 223 in the z-axis direction is approximately the same as a size d2 of the connected part body 631 in the z-axis direction (see FIG. 8). A size d3 of the snap-fit hole 223 in the y-axis direction is greater than a size d4 between outer walls of the two connected part bodies 631 facing away from each other in the y-axis direction (see FIG. 9).

The engagers 632 are formed integrally with the connected part bodies 631, respectively protruding away in the y-axis direction from the ends of the two connected part bodies 631 opposite to the pedal-side extender 23. The engager 632 has an inclined surface 633 and an engaging surface 634. The inclined surface 633 is formed in a rectangular planar shape to be inclined with respect to the xz plane. The engaging surface 634 is formed in a rectangular planar shape parallel to the yz plane. One end of the inclined surface 633 in the x-axis direction is connected to the connected part body 631, and the other end of the inclined surface 633 in the x-axis direction is connected to the engaging surface 634. One end of the engaging surface 634 in the y-axis direction is connected to the inclined surface 633, and the other end of the engaging surface 634 in the y-axis direction is connected to the connected part body 631 (see FIG. 9).

The connecting part 73 has a rectangular cross-sectional shape taken along a plane perpendicular to the plate-thickness direction of the actuator-side extender 22, that is, a non-perfect circular shape. The connected part 63 has a rectangular cross-sectional shape taken along a plane perpendicular to the plate-thickness direction of the pedal-side extender 23, that is, a non-perfect circular shape.

In the present embodiment, the connected part 63 and the connecting part 73 are connected by snap fitting.

More specifically, when assembling the accelerator device 100 and the reaction force applying device 10, the connected part 63 is inserted into the snap fit hole 223, that is, the connecting part 73. During assembling, the connected part 63 has the two inclined surfaces 633 fittingly slid on the inner wall of the snap-fit hole 223, thereby deforming the two connected part bodies 631 to bring the ends thereof on the opposite side from the pedal-side extender 23 closer to each other in the y-axis direction. When the actuator-side extender 22 and the pedal-side extender 23 come into contact, the deformation of the two connected part bodies 631 returns to the original state, and the engaging surface 634 engages a part of the surface of the actuator side extender 22, that is, a periphery of the snap-fit hole 223 or the connecting part 73 in other words, opposite to the pedal-side extender 23. Thereby, the connection between the connected part 63 and the connecting part 73 is complete, and the assembly of the accelerator device 100 and the reaction force applying device 10 is complete.

As explained above, the cross-sectional shape of the connected part 63 is a non-perfect circular shape. The cross-sectional shape of the connecting part 73 is a non-perfect circular shape. Therefore, as in the second embodiment, relative rotation between the pedal housing 110 and the actuator housing 20 is suppressible, and variation in the relative position thereof is further reducible.

Further, in the present embodiment, the connected part 63 and the connecting part 73 are connected by snap fitting. Therefore, the connected part 63 and the connected part 73 are easily and reliably connectable, and the connection between the connected part 63 and the connected part 73 is maintained even after assembly of the accelerator device 100 and the reaction force applying device 10, and variation of the relative position of the pedal housing 110 and the actuator housing 20 can be reduced over a long period of time.

Other Embodiments

In the embodiments described above, an example is shown, in which the lever 40 comes into contact with the arm 50 that rotates together with the pedal 120, and applies a reaction force to the pedal 120. On the other hand, in other embodiments, the lever 40 may directly contact the pedal 120 and apply a reaction force to the pedal 120, without providing the arm 50 on the pedal 120, for example.

Further, in the second and third embodiments, an example is shown in which one connected part and one connecting part are provided. On the other hand, in other embodiments, two or more connected parts and two or more connecting parts may be provided. In such case, relative rotation between the pedal housing and the actuator housing is suppressible, and variation of their relative position can be further reduced.

Further, in the second embodiment, an example is shown in which the connected part and the connecting part are connected by press fit, and in the third embodiment, an example is shown in which the connected part and the connecting part are connected by snap fitting. On the other hand, in other embodiments, the connected part and the connecting part may be connected by press-fitting and snap-fitting.

Further, in the second embodiment, an example is shown in which the connected part and the connecting part have a rectangular cross-sectional shape. On the other hand, in other embodiments, the cross-sectional shapes of the connected part and the connected part may be non-circular shapes such as elliptical shapes, oval shapes, polygonal shapes other than rectangles and the like.

Further, in other embodiments, the wall surface of the floor panel of the vehicle to which the reaction force applying device and the accelerator device are attached may be formed non-parallel to the yz plane. That is, the wall surface of the floor panel may be formed at any angle with respect to the vehicle.

Thus, the present disclosure is not limited to the above-described embodiments, but can be implemented in various forms without departing from the scope thereof.

The present disclosure has been described based on the embodiments. However, the present disclosure is not limited to the embodiments and disclosed structures. The present disclosure also encompasses various modifications and variations within the scope of equivalents. Furthermore, various combinations and formations, and other combinations and formations including one, more than one or less than one element may be encompassed within the idea of the present disclosure.

What is claimed is:

1. A reaction force applying device configured to apply, against a stepping force of a driver, a reaction force to a pedal of an accelerator device that includes: the pedal to be stepped by the driver; and a pedal housing provided to rotatably support the pedal and to be attached to a vehicle, the reaction force applying device comprising:
    an actuator housing to be attachable to the vehicle;
    an actuator provided in the actuator housing;
    a lever provided at the actuator housing, to be rotatable by receiving a driving force from the actuator, to contact the pedal or an arm rotating with the pedal, and to apply the reaction force to the pedal with respect to the stepping force of the driver;
    at least one connected part provided in the pedal housing; and
    at least one connecting part provided in the actuator housing and directly connected to the at least one connected part without through the lever and the arm,
    wherein the actuator housing is attached to the vehicle at a position away from the pedal housing by a predetermined distance.

2. The reaction force applying device of claim 1, wherein the at least one connected part is comprised of a plurality of connected parts, and
    the at least one connected part is comprised of a plurality of connecting parts.

3. The reaction force applying device of claim 1, wherein a cross-sectional shape of the at least one connected part is a non-perfect circular shape, and
    a cross-sectional shape of the at least one connecting part is a non-perfect circular shape.

4. The reaction force applying device of claim 1, further comprising:
    a bolt that fastens the at least one connected part and the at least one connecting part together.

5. The reaction force applying device of claim 1, wherein the at least one connected part and the at least one connecting part are connected by press fitting.

6. The reaction force applying device of claim 1, wherein the at least one connected part and the at least one connecting part are connected by snap fitting.

7. A reaction force applying device to apply a reaction force to a pedal of a vehicle against a pedal stepping force of a driver, the reaction force applying device comprising:
   an actuator housing to be attached to the vehicle;
   an actuator provided in the actuator housing;
   a lever provided at the actuator housing, to be rotatable by receiving a driving force from the actuator, to contact the pedal or an arm rotating with the pedal, and to apply the reaction force to the pedal with respect to the stepping force of the driver;
   a first connection part provided in a pedal housing in which the pedal is provided; and
   a second connection part provided in the actuator housing and directly connected to the first connection part without through the lever and the arm,
   wherein the actuator housing is attached to the vehicle at a position away from the pedal housing by a predetermined distance.

8. A reaction force applying device configured to apply, against a stepping force of a driver, a reaction force to a pedal of an accelerator device that includes: the pedal to be stepped by the driver; and a pedal housing provided to rotatably support the pedal and to be attached to a vehicle, the reaction force applying device comprising:
   an actuator housing to be attachable to the vehicle;
   an actuator provided in the actuator housing;
   a lever provided at the actuator housing, to be rotatable by receiving a driving force from the actuator, to contact the pedal or an arm rotating with the pedal, and to apply the reaction force to the pedal with respect to the stepping force of the driver;
   at least one connected part provided in the pedal housing; and
   at least one connecting part provided in the actuator housing and connected to the at least one connected part,
   wherein the actuator housing is attached to the vehicle at a position away from the pedal housing by a predetermined distance, and
   a bolt that fastens the at least one connected part and the at least one connecting part together.

* * * * *